R. BOWMAN.
Wagon-Coupling.

No. 162,611. Patented April 27, 1875.

WITNESSES:
P. C. Dieterich
W. C. McArthur

INVENTOR:
Robert Bowman
per T. R. Alexander
ATTORNEY.

THE GRAPHIC CO. PHOTO-LITH. 39 & 41 PARK PLACE, N.Y.

UNITED STATES PATENT OFFICE.

ROBERT BOWMAN, OF TERRE HAUTE, INDIANA.

IMPROVEMENT IN WAGON-COUPLINGS.

Specification forming part of Letters Patent No. 162,611, dated April 27, 1875; application filed March 30, 1875.

*To all whom it may concern:*

Be it known that I, ROBERT BOWMAN, of Terre Haute, in the county of Vigo and State of Indiana, have invented certain new and useful Improvements in Wagon-Couplings; and I do hereby declare that the following is a full, clear, and exact description thereof, reference being had to the accompanying drawings, and to the letters of reference marked thereon, which form part of this specification.

The nature of my invention consists in the construction and arrangement of a coupling for four-wheeled vehicles, as will be hereinafter more fully set forth.

In order to enable others skilled in the art to which my invention appertains to make and use the same, I will now proceed to describe its construction and operation, referring to the annexed drawing, in which—

Figure 1:
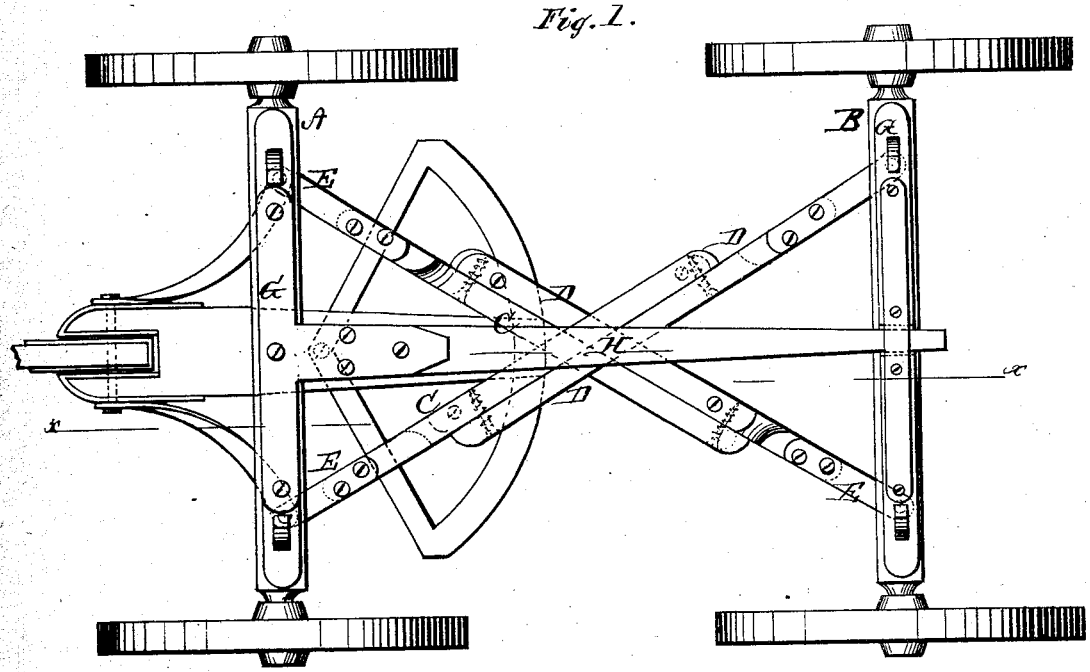
Figure 2:
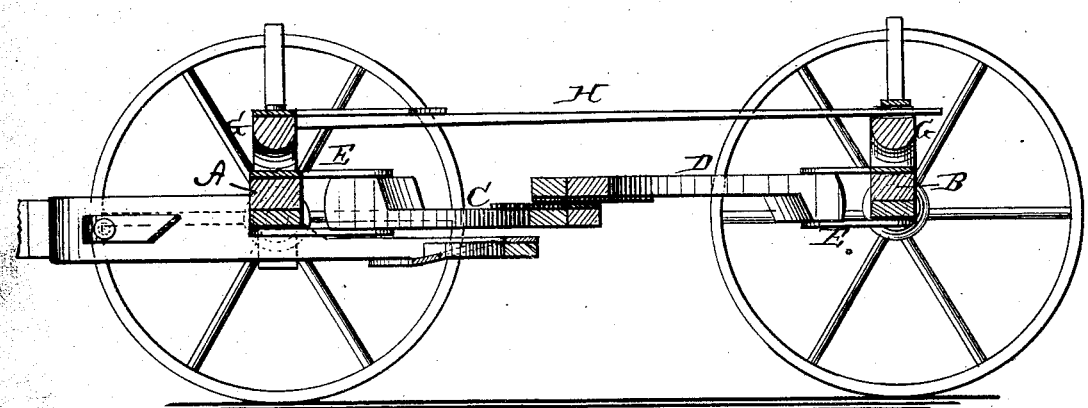

Figure 1 is a plan view of the running-gear of a wagon embodying my invention. Fig. 2 is a longitudinal section of the same.

A represents the front, and B the rear, axle of a four-wheeled wagon. The two axles are connected by means of adjustable cross-couplings, constructed as follows: Near each end of the front axle is attached a bar, C, by means of a clevis, E, or other suitable connection. To each of these bars is fastened a bar, D, which connects with the rear axle B near the other end by similar clevis or coupling E.

The coupling can be lengthened or shortened at will by changing the bolts or screws connecting the bars C D.

By the use of this coupling in turning the wagon both axles vibrate at the same time, causing the hind wheels to follow the tracks of the front wheels.

G G are the two bolsters, which are connected by a horizontal bar, H, to keep the same in place.

One advantage in turning a wagon provided with this cross-coupling is the small space required. The front and hind wheels rubbing the body at the same time can turn as short as when the wagon sits above the wheels.

This coupling saves both hounds, and can be made at much less cost, and is more durable, and much simpler, than the styles now in use.

I am aware that the axles of carriage-trucks have been used with cross-connections, and, therefore, do not, broadly, claim this idea.

Having thus fully described my invention, what I claim as new, and desire to secure by Letters Patent, is—

The combination, with the axles A B of a four-wheeled wagon, of the cross-couplings C D C D, made adjustable and connected to the axles by means of connections E E, substantially as and for the purposes set forth.

In testimony that I claim the foregoing as my own I affix my signature in presence of two witnesses.

ROBERT BOWMAN.

Witnesses:
ANDREW GRIMES,
LEWIS W. McMAHAN.